United States Patent
Parravicini

(10) Patent No.: US 6,931,939 B2
(45) Date of Patent: Aug. 23, 2005

(54) PRESSURE TRANSMITTER

(75) Inventor: Roberto Parravicini, Lenno (IT)

(73) Assignee: ABB Services S.R.L., Milan (IT)

( * ) Notice: Subject to any disclaimer, the term of this patent is extended or adjusted under 35 U.S.C. 154(b) by 49 days.

(21) Appl. No.: 10/477,952

(22) PCT Filed: May 14, 2002

(86) PCT No.: PCT/EP02/05554

§ 371 (c)(1),
(2), (4) Date: Nov. 18, 2003

(87) PCT Pub. No.: WO02/095347

PCT Pub. Date: Nov. 28, 2002

(65) Prior Publication Data

US 2004/0154404 A1 Aug. 12, 2004

(30) Foreign Application Priority Data

May 18, 2001 (IT) .................................... MI2001A1045

(51) Int. Cl.⁷ ............................................. G01L 7/00
(52) U.S. Cl. ...................................................... 73/756
(58) Field of Search ........................................... 73/756

(56) References Cited

U.S. PATENT DOCUMENTS

| 4,833,922 A | * | 5/1989 | Frick et al. | 73/756 |
| 5,656,782 A | * | 8/1997 | Powell et al. | 73/756 |
| 5,668,322 A | * | 9/1997 | Broden | 73/756 |
| 5,719,856 A | * | 2/1998 | May | 370/282 |
| 5,920,016 A | | 7/1999 | Broden | |
| 6,772,641 B2 | * | 8/2004 | Massimo et al. | 73/756 |
| 2003/0056603 A1 | * | 3/2003 | Massimo et al. | 73/861.47 |

FOREIGN PATENT DOCUMENTS

EP          1050752         11/2000

* cited by examiner

Primary Examiner—William Oen
Assistant Examiner—Andre Allen
(74) Attorney, Agent, or Firm—Connolly Bove Lodge & Hutz LLP; Larry J. Hume

(57) ABSTRACT

A pressure transmitter for sensing a physical variable related to a process fluid of an industrial plant, includes: a main body, which comprises a containment enclosure and a base associated with the containment enclosure; a first connection element, which comprises: a first coupling surface, at which the first connection element is associated with the base, the first coupling surface being arranged on a first arrangement surface; and at least one first process interface surface, which is arranged on a second arrangement surface; at least one second connection element, which is associated, at a second coupling surface, with the first connection element and, at a third coupling surface, with a manifold element that is suitable to convey the process fluid; its particularity encompassing the fact that the second coupling surface can be coupled to the first process interface surface, according to one or more selectable positions, so that the third coupling surface of the second connection element lies on one or more chosen arrangement surfaces.

18 Claims, 6 Drawing Sheets

PRESSURE TRANSMITTER

CROSS-REFERENCE TO RELATED APPLICATIONS

This application is a National Stage Entry of PCT/EP02/05554, filed on May 14, 2002, which claims priority to Italian application MI2001A001045 filed on May 18, 2001, the entire contents of each being incorporated herein by reference.

BACKGROUND OF THE INVENTION

The present invention relates to a pressure transmitter for sensing a physical variable related to a process fluid of an industrial plant having improved functions. More precisely, the present invention relates to a pressure transmitter that distinguishes itself from known types of pressure transmitter thanks to its higher versatility of use, which allows to obtain lower manufacturing and installation costs.

It is known that pressure transmitters are widely used in control systems of industrial processes with the aim of sensing/measuring one or more physical variables, such as absolute, relative or differential pressure, flow, turbulence, level and the like, of a process fluid and to send to a controller, by means of an appropriate communications network, for example a 4–20 mA communication line, signals that are representative of the value of the sensed physical variable. Typically, a pressure transmitter comprises a main body suitable to accommodate a pressure sensor and a plurality of electronic circuits. A pressure sensor is usually used which notoriously provides one or more measurements related to pressure (relative, differential or absolute pressure); by considering the appropriate boundary conditions, it is possible to obtain easily measurement values that also relate to other physical variables of the process fluid (level, flow, turbulence and the like) that it would be more difficult to transduce directly.

The electronic circuits are connected to the pressure sensor and process the signals supplied thereby so as to generate measurement signals that are representative of the process variable to be sensed. Said electronic circuits are furthermore given the task of managing the communication of the pressure transmitter with any external devices, for example with controllers or other pressure transmitters.

A pressure transmitter generally comprises an additional portion, which essentially consists of a process coupling system suitable to contain the process fluid so as to place the transmitter in contact with the process fluid, i.e. couple it, so that the transmitter can sense its intended physical variables.

Said process coupling system comprises a plurality of flanges, which are connected to manifold pipes inside which the process fluid flows. Each flange is rigidly associated with the main body of the pressure transmitter, at an interface surface provided with a flexible separation membrane. The separation membrane comprises an external wall, which is exposed to the process fluid, and an internal wall, which is coupled mechanically to the pressure sensor.

The mechanical coupling between the internal wall of each membrane and the pressure sensor is often obtained by means of a system of pipes filled with incompressible fluid, so that the pressure of the process fluid is transmitted without any damping effect.

However, known pressure transmitters have drawbacks.

A first drawback arises from the fact that the geometry of the process coupling system is generally rigidly preset. For example, in some known pressure transmitters, the coupling system has a co-planar geometry: the flanges are rigidly associated with interface surfaces that lie on a common horizontal plane, substantially at right angles to the main axis of symmetry of the pressure transmitter. As an alternative, in other known types of pressure transmitter the coupling system has a vertical geometry: in this case, the flanges are associated with interface surfaces arranged on vertical planes that are substantially parallel to the main axis of symmetry of the pressure transmitter.

Generally, in known types of pressure transmitter it is extremely difficult, if not impossible, to change the type of geometry of the coupling system, varying for example the arrangement of the flanges. Accordingly, since the manifold pipes are also in turn rigidly coupled, it is often necessary to resort, in order to obtain the connection of the flanges to the manifold pipes, to connection elements or to tanks arranged appropriately.

A second drawback arises from the fact that known types of pressure transmitter generally have a process coupling system that has a scarcely modular structure. This further reduces the possibility to connect the flanges to the pipes of manifolds easily and without the use of auxiliary elements.

Accordingly, one can say that known types of pressure transmitter generally have a relatively low operating flexibility. This fact implies that their installation and activation are sometimes difficult. This entails an increase in installation and operating costs. Furthermore, it is often necessary to resort to pressure transmitters of a different type in order to meet the different operating requirements that can occur during the installation of the control system. This clearly determines an increase in the production costs of the pressure transmitter.

SUMMARY OF THE INVENTION

The aim of the present invention is to provide a pressure transmitter that allows to solve the described drawbacks.

Within the scope of this aim, an object of the present invention is to provide a pressure transmitter that is provided with a process coupling system that has a substantially modular structure.

Another object of the present invention is to provide a pressure transmitter provided with a process coupling system whose geometry is variable according to the operating requirements of installation.

Another object of the present invention is to provide a pressure transmitter that is easy to manufacture and has relatively modest installation and production costs.

This aim, these objects and others that will become apparent hereinafter are achieved by a pressure transmitter for sensing a physical variable related to a process fluid of an industrial plant, comprising:

a main body, which comprises a containment enclosure and a base associated with said containment enclosure;

a first connection element, which comprises:

a first coupling surface, at which said first connection element is associated with said base, said first coupling surface being arranged on a first arrangement surface; and at least one first process interface surface, which is arranged on a second arrangement surface;

at least one second connection element, which is associated, at a second coupling surface, with said first connection element and, at a third coupling surface, with a manifold element that is suitable to convey said process fluid; characterized in that said second coupling surface can be coupled to said first process interface surface, according to one or more selectable positions, so that the third coupling surface of said second connection element lies on one or more chosen arrangement surfaces.

DESCRIPTION OF THE DRAWINGS

Further characteristics and advantages of the invention will become apparent from the description of some preferred but not exclusive embodiments of the pressure transmitter according to the present invention, illustrated only by way of non-limitative example in the accompanying drawings, wherein.

DESCRIPTION OF EMBODIMENTS OF THE INVENTION

Figure 1:
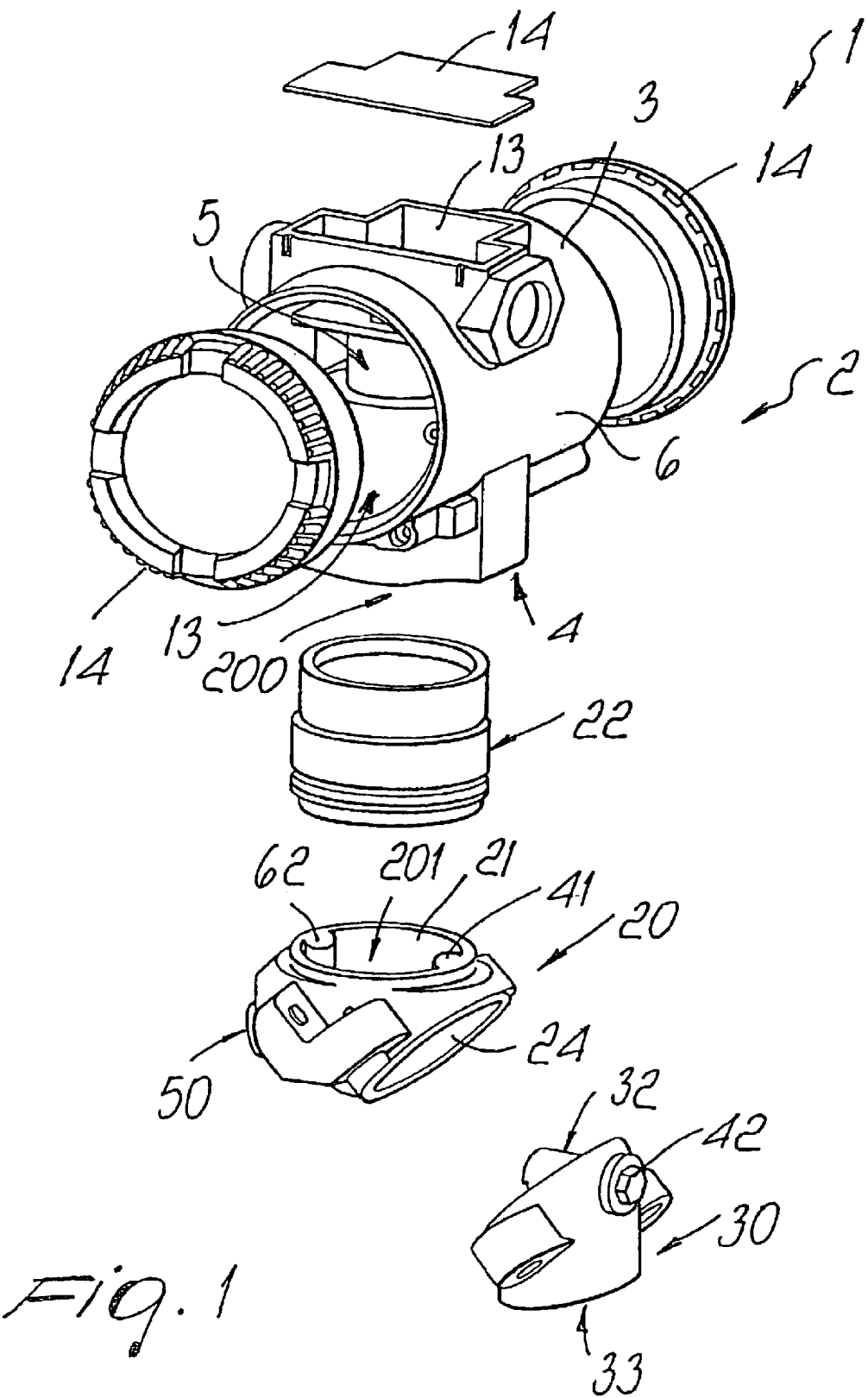
FIG. 1 is a schematic exploded view of a first embodiment of the pressure transmitter according to the present invention.

With reference to the above cited figures, the pressure transmitter, generally designated by the reference numeral 1, according to the present invention, is used to sense a physical variable related to a process fluid 8 of an industrial plant. The pressure transmitter 1 comprises a main body 2, constituted by a containment enclosure 3 and a base 4 associated therewith. Preferably, the containment enclosure 3 is constituted by a substantially cylindrical hollow element 6 connected to the base 4. Furthermore, the containment enclosure 3 can be provided with one or more openings 13 at which one or more removable covers 14 can be fixed.

The main body 2 furthermore has an opening 200 at the base 4 in order to allow access inside the containment enclosure 3.

Preferably (FIGS. 1 and 2), the containment enclosure 3 comprises a measurement chamber 5, which accommodates a pressure sensor 7 (FIG. 3) suitable to measure the differential, absolute or relative pressure of the process fluid 8. The containment enclosure 3 (FIG. 3) preferably also accommodates first electronic means 9 suitable to receive from the pressure sensor 7 first electronic signals 10, which are representative of the pressure P of the process fluid 8, and to generate, on the basis of the first electronic signals 10, second electronic signals 11, which are representative of one or more physical variables related to the process fluid 8. Advantageously (FIG. 3), the containment enclosure 3 can also enclose second electronic means 12, which are suitable to manage the communication of the pressure transmitter 1 with a remote location. For example, the second electronic means 12 can be connected to a communications network 15, for example of the 4–20 mA or Fieldbus type, in order to transmit the second electronic signals 11 to a control device 16 located remotely with respect to the pressure transmitter 1.

Figure 2:
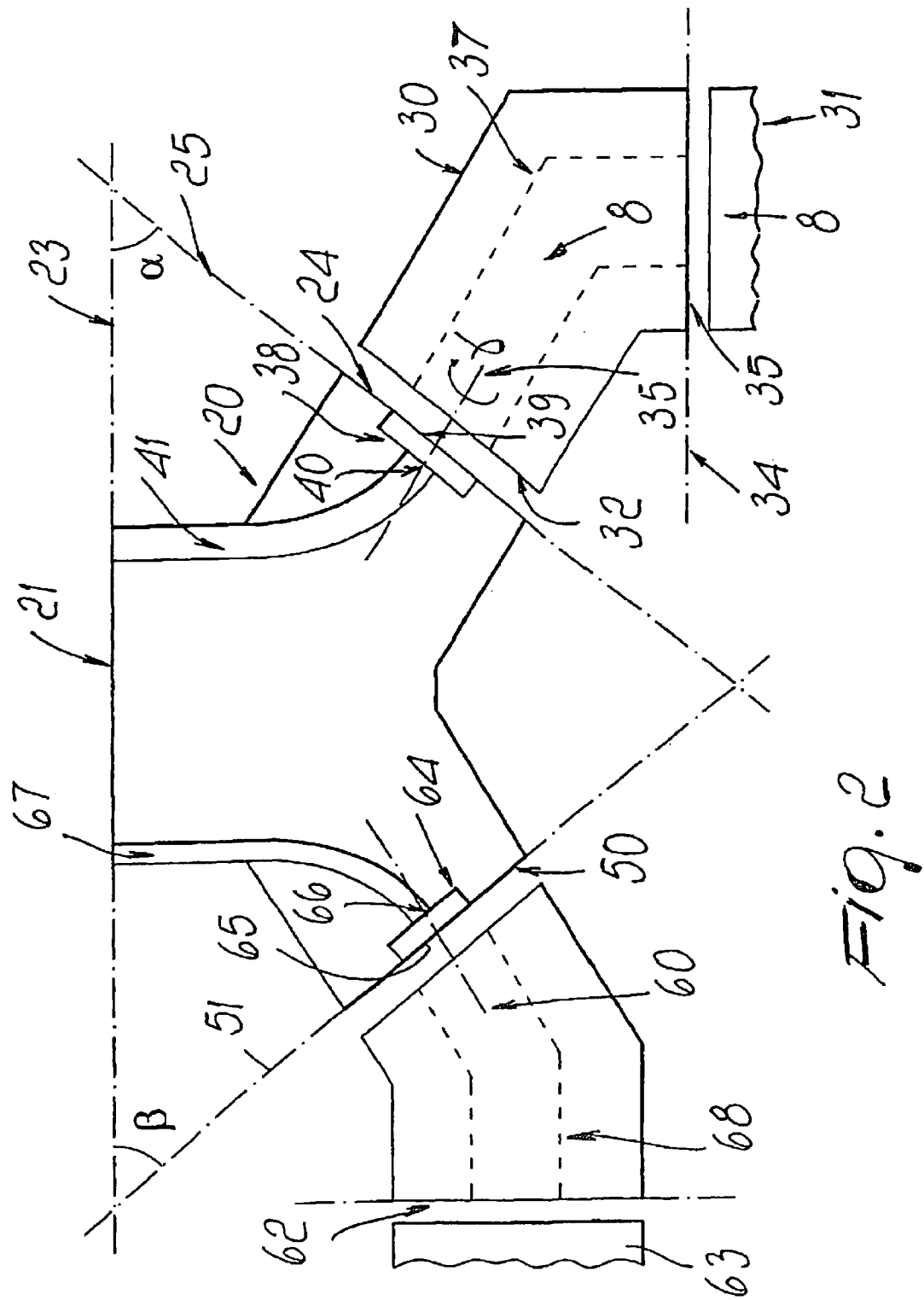
FIG. 2 is a sectional view of a portion of a pressure transmitter according to the present invention.

The pressure transmitter 1 according to the present invention comprises (FIGS. 1 and 2) a first connection element 20 provided with a first coupling surface 21 that lies on a first arrangement surface. Said first arrangement surface can comprise a curved surface (having a predefined curvature) or a flat surface. Preferably, as shown in FIG. 2, the first arrangement surface comprises a first arrangement plane 23.

The first connection element 20 can be provided in different manners: for example, it can comprise a substantially hollow body or, as an alternative, a solid body with appropriately preset through holes and openings. Advantageously, the first element 20 preferably has an opening 201 at the first coupling surface 21.

The first connection element 20 can be associated with the base 4 of the main body 2, at the first coupling surface 21. The coupling between the first coupling surface 21 and the base 4 can be provided directly or, preferably, by interposing a connection element 22.

The first connection element 20 comprises at least one first process interface surface 24 arranged on a second arrangement surface, which can also comprise a curved surface or a flat surface. Preferably (FIG. 2), the second arrangement surface comprises a second arrangement plane 25, which is inclined with respect to the first arrangement plane 23, so as to intersect it and form with it a predefined angle $\alpha$, preferably between 0 and 180°, as shown in FIGS. 1 and 2.

The pressure transmitter 1 according to the present invention also comprises a second connection element 30, which is associated with the first connection element 20 and with a manifold element 31 that is suitable to convey the process fluid 8. The coupling between the second connection element 30 and the first connection element 20 occurs at a second coupling surface 32, while the coupling between the second connection element 30 and the manifold element 31 occurs at a third coupling surface 33. A through cavity 37 (FIG. 2) can be advantageously present in the second connection element 30, preferably arranged between the second coupling surface 32 and the third coupling surface 33. The particularity of the pressure transmitter 1, according to the present invention, resides in that the second coupling surface 32 can be coupled to the first interface surface 24, according to one or more selectable positions, so that the third coupling surface 33 can lie on one or more intended arrangement surfaces, which preferably comprise one or more arrangement planes 34.

Figure 4:
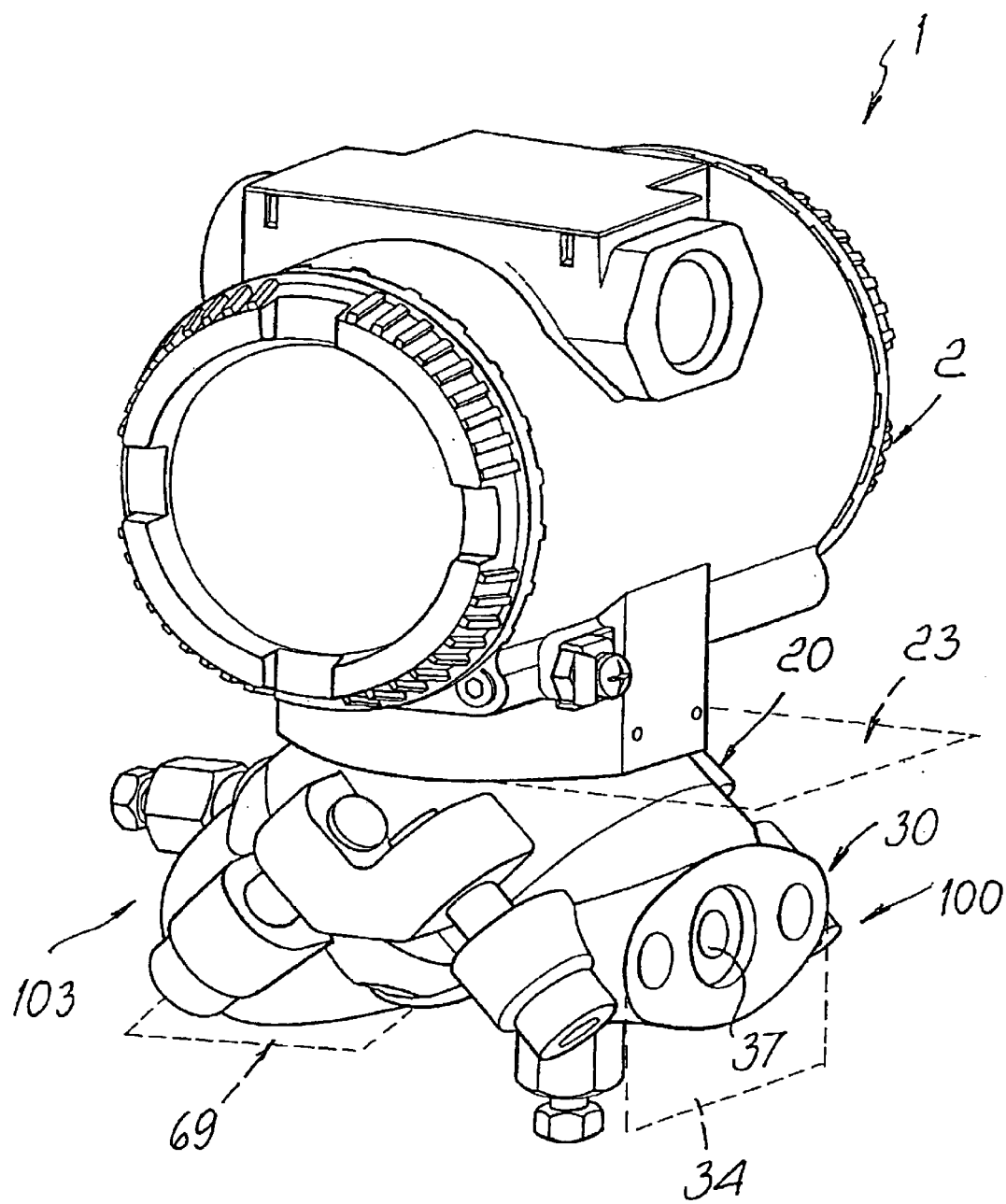
FIG. 4 is a schematic view of a second embodiment of the pressure transmitter according to the present invention.
Figure 5:
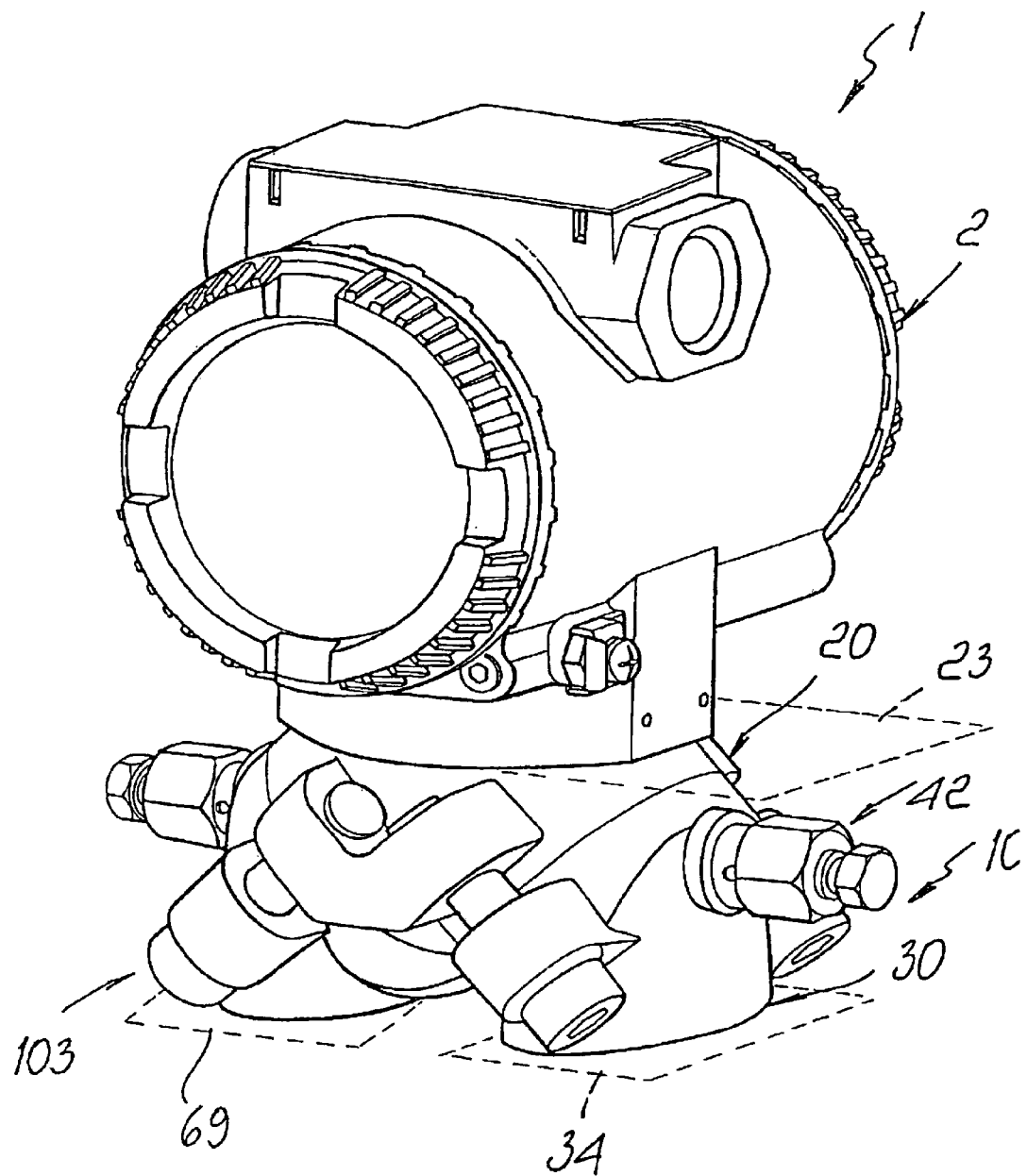
FIG. 5 is a schematic view of a third embodiment of the pressure transmitter according to the present invention.

The pressure transmitter 1 according to the present invention has considerable advantages. Since the coupling of the second connection element 30 to the first connection element 20 occurs according to one or more selectable positions, the process coupling system of the transmitter 1, constituted by the assembly of the first connection element 20 and of the second connection element 30, can be adapted easily to the requirements that arise during installation. For example, the second coupling surface 32 can be coupled to the first interface surface 24 according to a first position 100 (FIG. 4), so that the third coupling surface lies on an arrangement plane 34 that is substantially perpendicular to the first arrangement plane 23. As an alternative, the second coupling surface 32 can be coupled to the first interface surface 24 according to a second position 101 (FIG. 5), so that the third coupling surface lies on an arrangement plane 34 that is substantially parallel to the first arrangement plane 23.

Obviously, according to the requirements, the second coupling surface 32 can be coupled to the first interface surface 24 according to multiple positions, which can be selected during installation. Each position corresponds to a certain rotation angle γ (FIG. 2) of the second coupling surface 32 with respect to the first interface surface 24 about an axis 35 that is perpendicular thereto. In practice, each position can be selected by fixing appropriately, for example by means of a system of bolts or a ring, the second connection element 30 to the first connection element 20. In this manner, for example, it is sufficient to use a simple pair of bolts (FIGS. 4 and 5) to select the positions 100 and 101, characterized by two rotation angles $\gamma_1$ and $\gamma_2$ which differ by 180° with respect to each other. As an alternative, it is sufficient to use a set of three bolts to select three positions characterized by three rotation angles $\gamma_1 \ldots \gamma_3$ which are mutually offset by 120°, and so forth. Obviously, similar solutions can be found by using a connecting ring.

In an alternative embodiment (not shown), an articulation element, for example a spherical element, can be positioned (and fixed, for example by means of a ring) between the second coupling surface 32 and the first interface surface 24. This solution is particularly advantageous, since it allows to utilize an additional degree of freedom in positioning the third coupling surface on a chosen arrangement plane. In this case, the rotation of the second connection element 30 with respect to the first connection element 20 can in fact be performed three-dimensionally and not necessarily in two dimensions, i.e., on the arrangement plane 25.

An additional advantage of the pressure transmitter according to the present invention is the fact that by using a single second connection element it is possible to provide the connection between the pressure transmitter 1 and the manifold pipe 31 according to a plurality of arrangement planes 34 that can be selected according to the requirements. In this manner, the installation and activation of the pressure transmitter 1 is particularly easy, even if the manifold element 31 is in an unfavorable position. This allows to avoid resorting to expensive and bulky connecting elements or tanks, as in known types of pressure transmitter.

Figure 3:
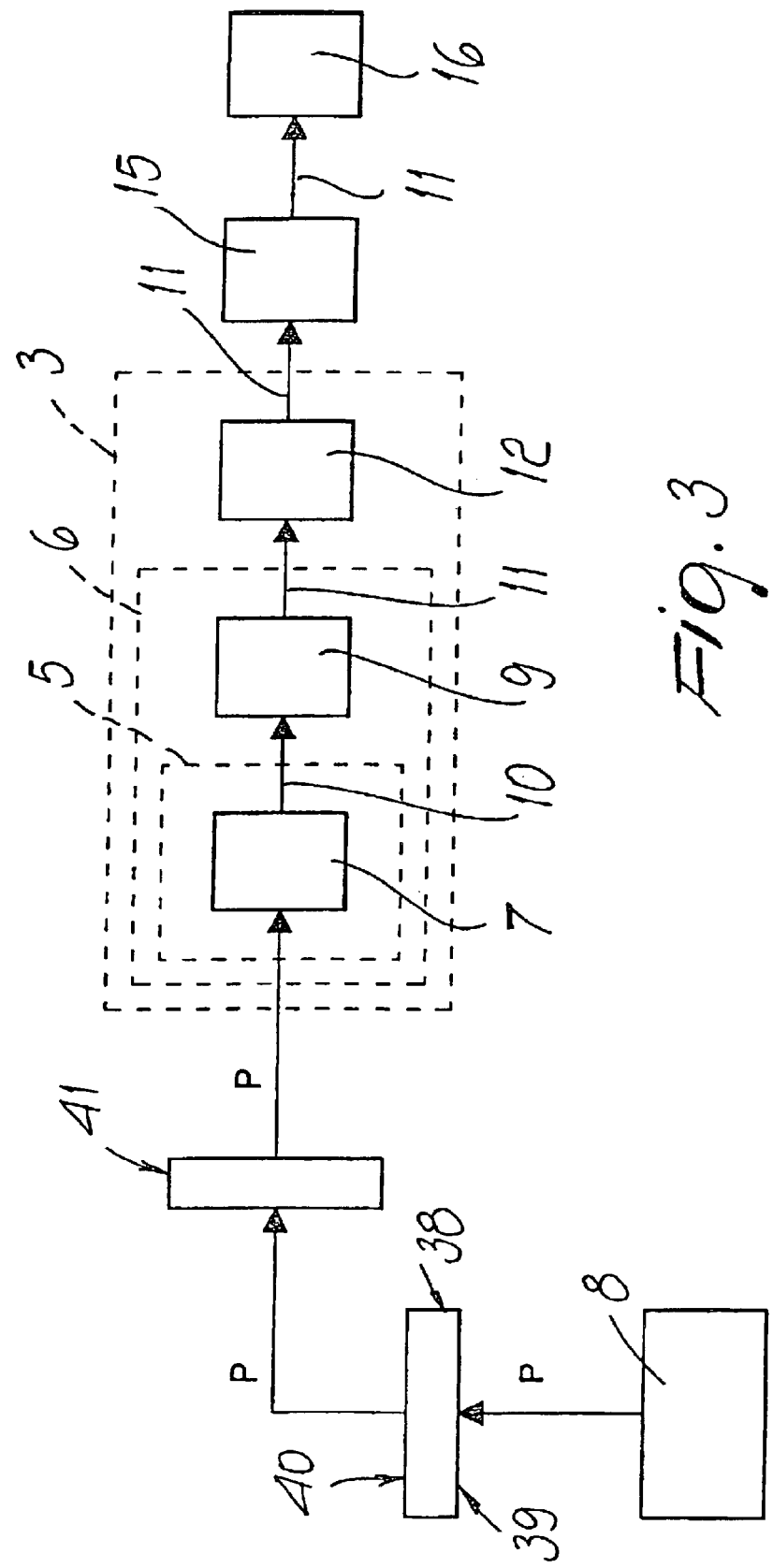
FIG. 3 is a view of the operation of the pressure transmitter according to the present invention.

Preferably, the first connection element 20 comprises (FIG. 2) a first membrane 38 (preferably a flexible one) arranged at the first process interface surface 24. The first membrane 38 advantageously comprises an external wall 39, which is exposed to the process fluid 8, and an internal wall 40, which is suitable to transmit the pressure of the process fluid 8. In practice, the process fluid 8, conveyed by the manifold element 31, is free to access the wall 39 by means of the through cavity 37. In this manner, the wall 40 of the first membrane 39 can transmit the pressure of the process fluid 8 to first coupling means 41. The first coupling means 41, suitable to couple mechanically the pressure sensor 7 to the internal wall 40 of the first membrane 38, can advantageously comprise a flexible hose filled with an incompressible fluid, for example silicone oil, and accommodated inside the first connection element 20. Said flexible hose, connected to the measurement chamber 5, can exit from the first connection element 20 at the opening 201 and access the containment enclosure 3 through the opening 200. In this manner, the pressure P of the process fluid 8 can be transmitted to the pressure sensor 7 (FIG. 3).

Advantageously, the first connection element 20 can also comprise a second process interface surface 50, which lies on a third arrangement surface, which preferably comprises a third arrangement plane 51. Preferably, a second membrane 64 (preferably a flexible one) is arranged at the second process interface surface 50. The second membrane 64 advantageously comprises an external wall 65 and an internal wall 66. If one wishes to provide a differential measurement of the pressure of the process fluid 8, the external wall 65 can be exposed to the process fluid 8, while if one wishes to provide a measurement of the relative or absolute pressure of the process fluid 8, the external wall 65 can be exposed to a fluid having a predefined reference pressure, for example atmospheric pressure or vacuum. The internal wall 66 is suitable to transmit the pressure of the process fluid 8 or of said reference fluid to the pressure sensor 7 by virtue of second coupling means 67, whose structure is, for example, similar to the structure of the first coupling means 41.

Preferably, a third connection element 60 is associated with the first connection element 20 at a fourth coupling surface 61. Furthermore, the third connection element 60 can be associated, at a fifth coupling surface 62, with a second manifold element 63, which is suitable to convey the process fluid 8. Advantageously, the third connection element 60 also can comprise a through cavity 68 between the fourth coupling surface 61 and the fifth coupling surface 62.

Figure 6:
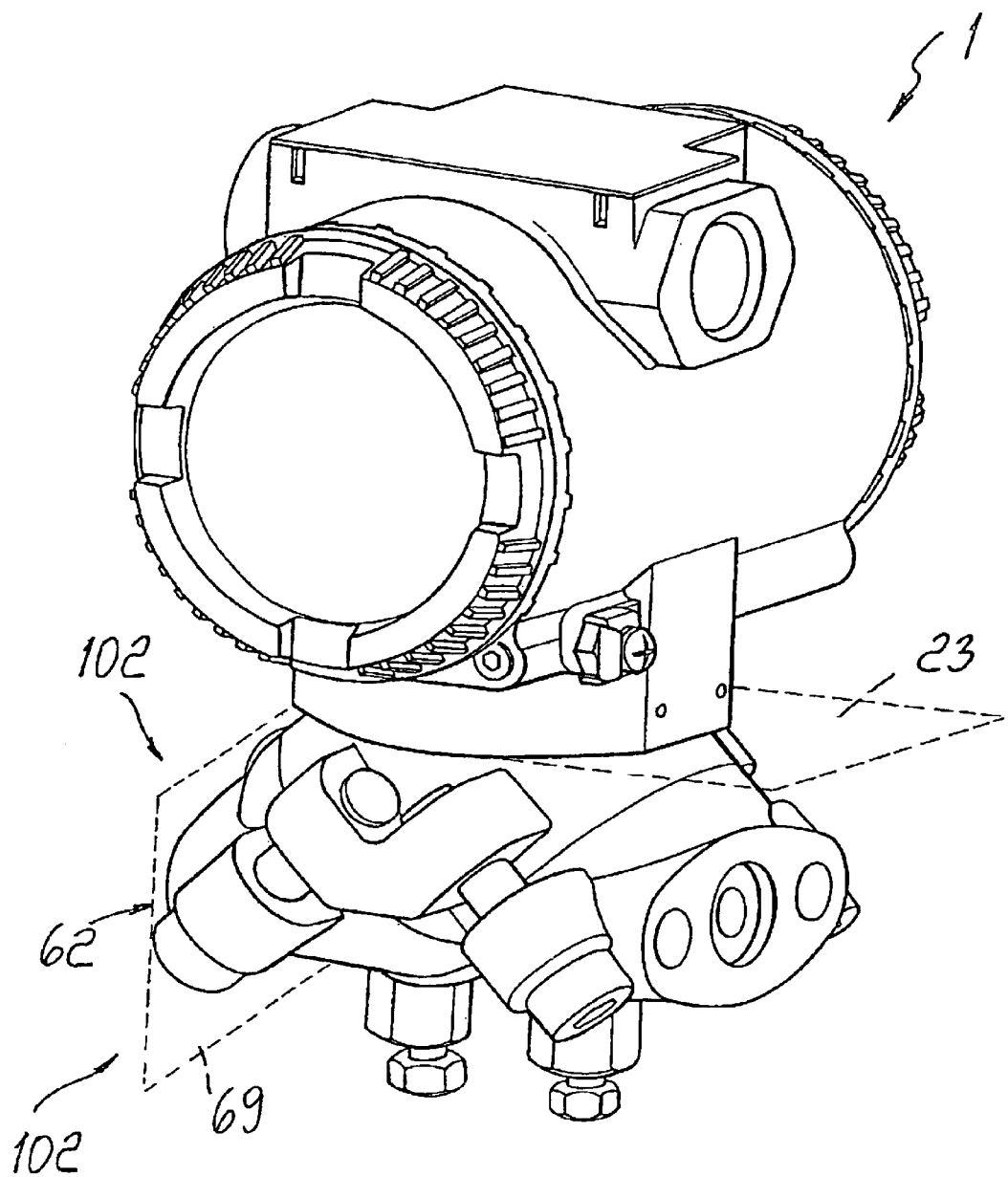
FIG. 6 is a schematic view of a fourth embodiment of the pressure transmitter according to the present invention.

Preferably, the third arrangement plane 51 is inclined with respect to the first arrangement plane 23 so as to intersect it and form with it a predefined angle β between 0 and 180°. Advantageously, the fourth coupling surface 61 can be coupled to the second interface surface 50 according to one or more selectable positions, so that the fifth coupling surface 62 lies on one or more intended arrangement surfaces, which comprise, for example, the arrangement planes 69. For example, the fourth coupling surface 61 can be coupled to the second interface surface 50 according to a third position 102 (FIG. 6), on the basis of which the fifth coupling surface 62 lies on an arrangement plane 69 that is substantially perpendicular to the first arrangement plane 23. As an alternative, the fourth coupling surface 61 can be coupled to the second interface surface 50 according to a third position 103 (FIGS. 4 and 5), on the basis of which the fifth coupling surface 62 lies on an arrangement plane 69 that is substantially parallel to the first arrangement plane 23. Obviously, according to the requirements, the fourth coupling surface 61 can be coupled to the second interface surface 50 according to a plurality of positions that can be selected during installation. This can be achieved simply, in a manner similar to the one described above, by rotating the fourth coupling surface 61 about an axis 70 that is perpendicular thereto and by using an appropriate system of bolts or a ring for connection. In a manner similar to the one described above, it is advantageously possible to use an articulation element arranged between the second process interface surface 50 and the fourth coupling surface 61.

In this manner, by using a single third connection element, it is possible to provide the connection between the pressure transmitter 1 and the manifold pipe 63 along a plurality of arrangement planes 34 that can be selected according to the requirements. This further increases the flexibility of installation of the pressure transmitter according to the present invention.

In practice it has been found that the pressure transmitter 1 according to the present invention allows to achieve the intended aim and objects.

In particular, the pressure transmitter according to the present invention comprises a process coupling system, constituted by the first connection element 20, by the second connection element 30 and/or by the third connection element 60, that has a substantially modular structure and a geometry that is variable according to the functional requirements of installation. This allows to overcome effectively the drawbacks of known types of pressure transmitter. Furthermore, by virtue of the particular modular structure of the connection system, the pressure transmitter according to the present invention is particularly easy to provide and simple to use. This allows to reduce considerably production and installation costs.

The pressure transmitter thus conceived is susceptible of numerous modifications and variations, all of which are within the scope of the inventive concept.

All the details may furthermore be replaced with other technically equivalent elements.

In practice, the materials used, as well as the contingent shapes and dimensions, may be any according to the requirements and the state of the art.

What is claimed is:

1. A pressure transmitter for sensing a physical variable related to a process fluid of an industrial plant, comprising:
    a main body, which comprises a containment enclosure and a base associated with said containment enclosure;
    a first connection element, which comprises:
        a first coupling surface, at which said first connection element is associated with said base, said first coupling surface being arranged on a first arrangement surface; and
        at least one first process interface surface, which is arranged on a second arrangement surface;
    at least one second connection element, which is associated, at a second coupling surface, with said first connection element and, at a third coupling surface, with a manifold element that is suitable to convey said process fluid;
    wherein said second coupling surface can be coupled to said first process interface surface, according to one or more selectable positions, so that the third coupling surface of said second connection element lies on one or more chosen arrangement surfaces.

2. The pressure transmitter according to claim 1, wherein said second connection element comprises a through cavity between said second coupling surface and said third coupling surface.

3. The pressure transmitter according to claim 1, wherein:
    said first arrangement surface comprises a first arrangement plane; and
    said second arrangement surface comprises a second arrangement plane, which is inclined with respect to said first arrangement plane, so as to intersect said first arrangement plane and form a predefined angle therewith.

4. The pressure transmitter according to claim 3, wherein said second coupling surface is suitable for being coupled to said process interface surface, according to one or more selectable positions, so that the third coupling surface of said second connection element lies on one or more chosen arrangement planes.

5. The pressure transmitter according to claim 4, wherein said second coupling surface is coupled to said first process interface surface according to a first position, on the basis of which said third coupling surface lies on an arrangement plane that is substantially perpendicular to said first arrangement plane, or according to a second position, on the basis of which said third coupling surface lies on an arrangement plane that is substantially parallel to said first arrangement plane.

6. The pressure transmitter according to any one of claims 1–5, further comprising an articulation element that is arranged between said second coupling surface and said first process interface surface.

7. The pressure transmitter according to any one of claims 1–5, wherein said first connection element comprises a second process interface surface which lies on a third arrangement surface.

8. The pressure transmitter according to claim 7, further comprising a third connection element which is associated, at a fourth coupling surface, with said first connection element and, at a fifth coupling surface, with a second manifold element suitable to convey said process fluid.

9. The pressure transmitter according to claim 7, wherein said second interface surface can be coupled to the fourth coupling surface according to one or more selectable positions, so that the fifth coupling surface of said third connection element lies on one or more chosen arrangement surfaces.

10. The pressure transmitter according to claim 8, wherein said third connection element comprises a through cavity between said fourth coupling surface and said fifth coupling surface.

11. The pressure transmitter according to claim 8, wherein said third arrangement surface comprises a third arrangement plane which is inclined with respect to said first arrangement plane, so as to intersect said first arrangement plane and form a preset angle therewith.

12. The pressure transmitter according to claim 8, wherein said second process interface surface is suitable for being coupled to said fourth coupling surface according to one or more selectable positions, so that the fifth coupling surface of said second connection element lies on one or more chosen arrangement planes.

13. The pressure transmitter according to claim 12, wherein said fourth coupling surface is coupled to said second process interface surface according to a third position, on the basis of which said fifth coupling surface lies on an arrangement plane that is substantially perpendicular to said first arrangement plane, or according to a fourth position, on the basis of which said fifth coupling surface lies on an arrangement plane that is substantially parallel to said first arrangement plane.

14. The pressure transmitter according to claim 8, further comprising an articulation element that is arranged between said fourth coupling surface and said second process interface surface.

15. The pressure transmitter according to claim 1, wherein said first connection element comprises a first membrane, which is arranged at said first process interface surface and comprises an external wall exposed to said process fluid and an internal wall suitable to transmit the pressure of said process fluid and/or a second membrane which is arranged at said second process interface surface and comprises an external wall exposed to said process fluid or to a fluid at predefined pressure and an internal wall suitable to transmit the pressure of said process fluid or of said fluid at predefined pressure.

16. The pressure transmitter according to claim 1, wherein said main body comprises:
    a measurement chamber suitable to accommodate a pressure sensor;
    first coupling means for coupling mechanically said pressure sensor to the internal wall of said first membrane, so that the pressure of said process fluid is transmitted to said pressure sensor; and
    first electronic means suitable to receive from said sensor first electronic signals, which are representative of the pressure of said process fluid, and to generate on the basis of said first electronic signals second electronic signals which are representative of one or more physical variables related to said process fluid.

17. The pressure transmitter according to claim 1, wherein said containment enclosure comprises second coupling means for coupling mechanically said pressure sensor to the internal wall of said second membrane, wherein the pressure of said process fluid or of said reference fluid is transmitted to said pressure sensor.

18. The pressure transmitter according to claim 1, further comprising second electronic means suitable to manage the communication of said pressure transmitter with another control and/or measurement device.

* * * * *